US012625948B2

(12) United States Patent
Nyamwange et al.

(10) Patent No.: US 12,625,948 B2
(45) Date of Patent: May 12, 2026

(54) USING MACHINE LEARNING TO DETECT QRLjacking TO PREVENT MULTICHANNEL PHISHING ON APPLICATIONS OR IOT DEVICES

(71) Applicant: Bank of America Corporation, Charlotte, NC (US)

(72) Inventors: Elvis Nyamwange, Little Elm, TX (US); Erik Dahl, Newark, DE (US); Brian Jacobson, Los Angeles, CA (US); Pratap Dande, Saint Johns, FL (US); Hari Vuppala, Charlotte, NC (US); Rahul Yaksh, Austin, TX (US); Rahul Phadnis, Charlotte, NC (US); Amer Ali, Jersey City, NJ (US); Sailesh Vezzu, Hillsborough, NJ (US)

(73) Assignee: Bank of America Corporation, Charlotte, NC (US)

( * ) Notice: Subject to any disclaimer, the term of this patent is extended or adjusted under 35 U.S.C. 154(b) by 187 days.

(21) Appl. No.: 18/221,652

(22) Filed: Jul. 13, 2023

(65) Prior Publication Data

US 2025/0021640 A1     Jan. 16, 2025

(51) Int. Cl.
*G06F 21/53* (2013.01)
*G06K 19/06* (2006.01)
*H04L 9/40* (2022.01)

(52) U.S. Cl.
CPC ....... *G06F 21/53* (2013.01); *G06K 19/06037* (2013.01); *H04L 63/1483* (2013.01)

(58) Field of Classification Search
CPC .............. G06F 21/53; G06K 19/06037; H04L 63/1483
See application file for complete search history.

(56) References Cited

U.S. PATENT DOCUMENTS 10,701,086 B1 * 6/2020 Mushtaq ............. H04L 47/2483
10,803,432 B1 10/2020 Miles
(Continued)

FOREIGN PATENT DOCUMENTS

| CN | 116029315 A | 4/2023 |
| KR | 102146088 B1 | 8/2020 |
| WO | 2018198036 A1 | 11/2018 |

OTHER PUBLICATIONS

A. Pawar, C. Fatnani, R. Sonavane, R. Waghmare and S. Saoji, "Secure QR Code Scanner to Detect Malicious URL using Machine Learning," 2022 2nd Asian Conference on Innovation in Technology (ASIANCON), Ravet, India, 2022, pp. 1-8 (Aug. 28, IEEE 2022) (Year: 2022).*

(Continued)

*Primary Examiner* — Theodore C Parsons
(74) *Attorney, Agent, or Firm* — Banner & Witcoff, Ltd.

(57) ABSTRACT

Aspects of the disclosure relate to using multiple machine learning models and a sand-box environment to detect malicious uniform resource locators (URLs) and login pages stored in a QR code. An application on a computing device will augment QR code data stored in a QR code and the computing device sends the QR code data and computing device metadata to a deep learning computing platform. The QR code data may comprise a URL and communication protocol information. The deep learning computing platform will generate, by multiple machine learning models and a sand-box environment, a sand-box score using the URL, a user-based score using the computing device metadata, and a connections score using the communication protocol information. The deep learning platform then determines whether the computing device should reject and delete the QR code data based on whether the scores are below a pre-determined threshold.

20 Claims, 8 Drawing Sheets

(56) References Cited

U.S. PATENT DOCUMENTS

| 2013/0167208 | A1 | | 6/2013 | Shi | |
|---|---|---|---|---|---|
| 2016/0342993 | A1 | | 11/2016 | Morgan et al. | |
| 2020/0252803 | A1 | * | 8/2020 | Shah | G06N 20/20 |
| 2021/0344693 | A1 | * | 11/2021 | Azad | G06F 21/566 |
| 2021/0377304 | A1 | * | 12/2021 | Ma | G06F 40/284 |
| 2022/0040596 | A1 | | 2/2022 | Restivo et al. | |

OTHER PUBLICATIONS

Dahan, Marc, "What is Qrljacking and how can you prevent it?" Comparitech, Nov. 21, 2021, <https://www.comparitech.com/blog/information-security/what-is-qrljacking/>.
"Qrljacking Overview—What is it?" Wallarm Learning Center, Published May 27, 2022, <https://www.wallarm.com/what/qrljacking-overview-what-is-it>.
Khandelwal, Swati, "QRLJacking—Hacking Technique to Hijack QR Code Based Quick Login System," The Hacker News, Jul. 28, 2016, https://thehackernews.com/2016/07/qrljacking-hacking-qr-code.html.
"Introduction of QR code attacks and countermeasures," HKCERT, Jan. 20, 2022, https://www.hkcert.org/blog/introduction-of-qr-code-attacks-and-countermeasures.
Al-Zahrani, Mohammed, et al., "Secure Real-Time Artificial Intelligence System against Malicious QR Code Links," Hindawi, Security and Communication Networks, Jan. 28, 2021, 11 pages, https://www.hindawi.com/journals/scn/2021/5540670/.

* cited by examiner

USING MACHINE LEARNING TO DETECT QRLjacking TO PREVENT MULTICHANNEL PHISHING ON APPLICATIONS OR IOT DEVICES

BACKGROUND

Quick response (QR) codes are machine-readable, two dimensional barcodes used to store data. QR codes may also store a variety of data, including transaction information, authentication information, simple text messages, contact information and uniform resource locators (URL). Mobile devices usually come with a built in QR scanner in their camera application, which is secure, while others rely on third-party QR scanners. Attackers can easily embed a malicious URL containing custom malware into a QR code that can exfiltrate data from a mobile device when scanned. The ability to alter a QR code, especially a dynamic QR code, to point to an alternative resource without being detected may be highly effective for malevolent users.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure provide effective, efficient, scalable, and convenient technical solutions that address various issues in the prior art with quick response (QR) code login jacking (QrlJacking) or malicious QR codes used to phish user login information and/or other personal data. Multiple machine learning models and a sand-box environment are used by a deep learning computing platform to detect whether the URL or login page associated with a QR code is potentially malicious and/or attempting to access user login information or personal data on a computing device.

In accordance with one or more embodiments, a system or method comprising a computing device and a deep learning computing platform is disclosed. The deep learning computing platform, with at least one processor and memory, may receive by a sand-box controlled module comprising a sand-box environment and a website prediction model, QR code data from a computing device associated with an application. The QR code data may comprise a uniform resource locator (URL) and communication protocol information. The application is configured to generate and send a restriction flag to a system root of the computing device that causes the computing device to restrict access when a QR code is scanned. The deep learning computing platform then may receive computing device metadata from the computing device. The computing device metadata may comprise a location of the computing device, a timestamp, and a device IP address. The website prediction model may generate a website score using the URL. The URL is executed in the sand-box environment which generates a sand-box score based on the website score and whether the executed URL matches a known rejected URL stored in a sand-box training database. The sand-box controlled module sends the sand-box score to an approval unit. The communication protocol information is then sent to a connections prediction model. The connections prediction model generates a connections score using the communication protocol information and the connections score is sent to the approval unit. The computing device metadata is then sent to a user-based prediction model. The user-based prediction model generates a user-based score using the computing device metadata and sends the user-based score to the approval unit. The approval unit determines that at least one of the sand-box score, connections score, or user-based score, or combination thereof, is below a pre-determined threshold and the approval unit generates a rejected flag. The deep learning computing platform sends the rejected flag to the computing device. The rejected flag causes the computing device to delete the QR code data before causing the restriction flag to be removed so that the access to the computing device is no longer restricted.

In some embodiments, the deep learning computing platform trains and develops the website prediction model based on a sand-box training database. The sand-box training database may store a plurality of known accepted and rejected URLs. The deep learning computing platform also trains the user-based prediction model based on a user-based training database. The user-based training database may store a plurality of known computing device metadata. The deep learning computing platform may also train the connections prediction model based on the connections training database. The connections training database may store a plurality of known communication protocol information.

In some embodiments, the connections protocol information is sent to a connections training database. The deep learning computing platform updates and adds the communication protocol information to the connections training database. The connections prediction model is re-developed by training the connections prediction model based on the connections training database. The computing device metadata is sent to a user-based training database. The deep learning computing platform updates and adds the computing device metadata to the user-based training database. The user-based prediction model is re-developed by training the user-based prediction model based on the user-based training database. The URL is sent to the sand-box training database. The deep learning computing platform updates and adds the URL to the sand-box training database. The website prediction model is re-developed by training the website prediction model based on the sand-box training database.

In some embodiments, the computing device further comprises a camera and the camera is configured to scan a QR code. The application is configured to process the QR code to augment the QR code data. The augmented QR code data is sent from the computing device to the deep learning computing platform. The deep learning computing platform receives the augmented QR code data from the computing device.

In some embodiments, if the sand-box controlled module is not able to generate a sand-box score, then the QR code data and computing device metadata is added to a review queue for manual review.

In some embodiments, the communication protocol information comprises an IP packet header that comprises at least a source IP address and a destination IP address.

In some embodiments, the communication protocol information comprises secure socket layers (SSL) or transport layer security (TLS) certificates.

In some embodiments, the rejected flag also causes the computing device to generate a message on a graphical user interface (GUI) of the computing device that indicates the QR code data is rejected and potentially malicious.

In some embodiments, the restriction flag causes the computing device to restrict access to any code or installation that may run on the computing device.

In some embodiments, the computing device in a smart phone, tablet, smart watch, or mobile device.

These and additional aspects will be appreciated with the benefit of the disclosures discussed in further detail below. Moreover, the figures herein illustrate the foregoing embodiments in detail.

BRIEF DESCRIPTION OF THE DRAWINGS

A more complete understanding of aspects described herein and the advantages thereof may be acquired by referring to the following description in consideration of the accompanying drawings, in which like reference numbers indicate like features.

DETAILED DESCRIPTION

Figure 1:
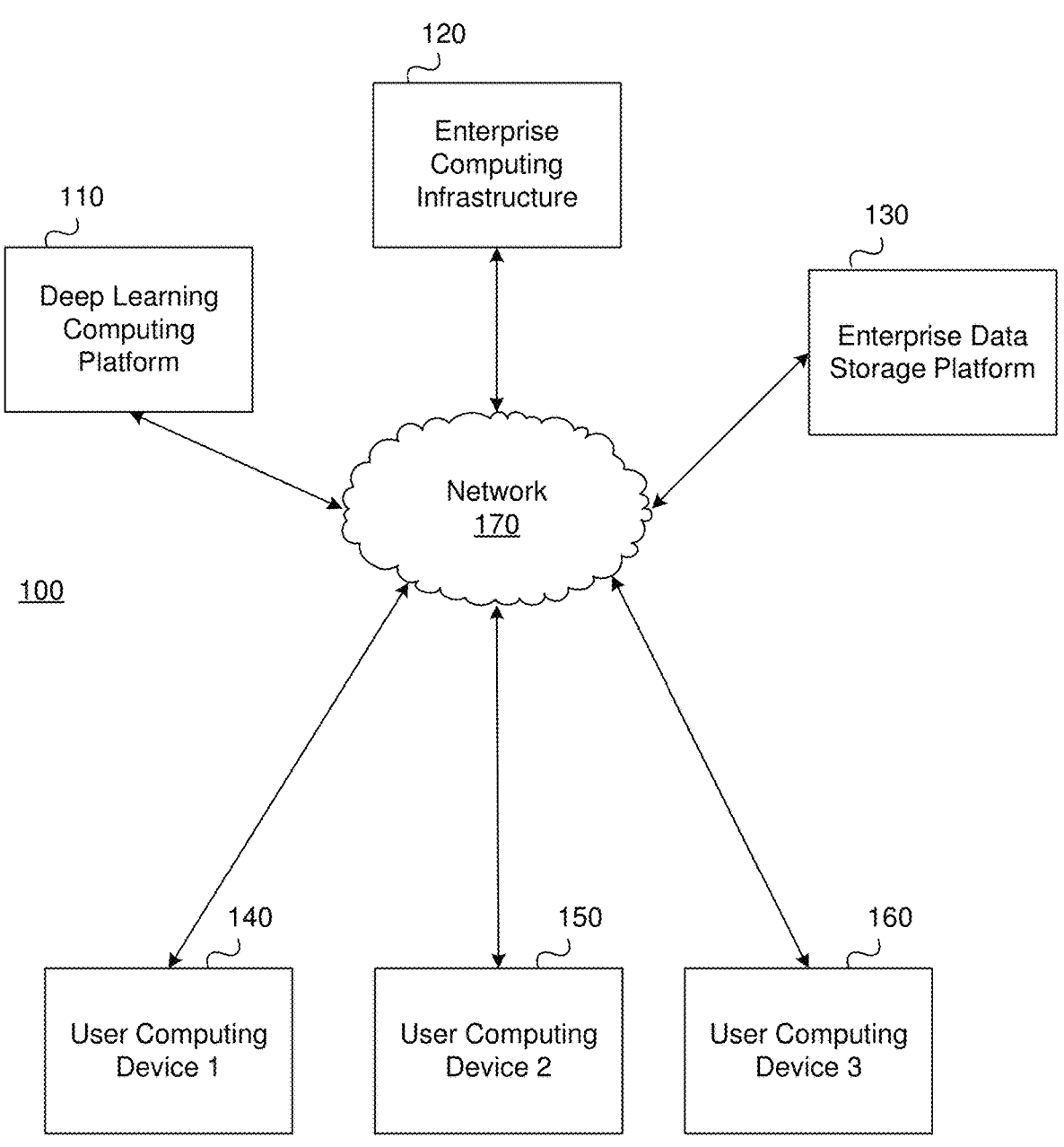
FIG. 1 depicts an illustrative example of a computing environment in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

It is noted that various connections between elements are discussed in the following description. It is noted that these connections are general and, unless specified otherwise, may be direct or indirect, wired or wireless, and that the specification is not intended to be limiting in this respect.

As a general introduction to the subject matter described in more detail below, aspects described herein are directed towards the methods and systems disclosed herein. Aspects of this disclosure provide effective, efficient, scalable, and convenient technical solutions that address various issues in the prior art with quick response (QR) code login jacking or malicious QR codes used to phish user login information and/or other personal data. Multiple machine learning models and a sand-box environment are used by a deep learning computing platform to detect whether the URL or login page associated QR code data from a scanned QR code is potentially malicious and/or attempting to access user login information or personal data on a computing device.

QR codes are a type of matrix barcode, or two-dimensional barcode, that is a machine-readable optical label that stores information. QR codes use four standardized encoding modes to store data including, but not limited to: numeric, binary/byte, alphanumeric, and kanji. QR codes may also store data by using extensions of these encoding modes. QR codes may also by static or dynamic. Static QR codes cannot have the data stored in the static QR code edited after its creation. Dynamic QR codes may have the data stored in the dynamic QR code edited after its creation. Dynamic QR codes are susceptible to manipulation by bad actors and may have their data changed to point to potentially malicious resources.

Quick response code login jacking (Qrljacking) is a simple-but-sophisticated stack vector that can affect all applications or devices that rely on a login with QR code feature as a secure way to login to accounts on various enterprise applications or websites. Detecting whether a QR code has been tampered with is impossible to a human as QR codes are only machine-readable. A malicious actor may tamper with a QR code to point a user who scans it to a fake login page for an enterprise application or website and/or other applications and accounts. For example, a user may scan a tempered QR code that loads a website that is almost identical to a website the user has an account on. By using this fake website that the QR code points to, a user may be phished into giving away login information or personal data. Preventing phishing attacks from happening is difficult to detect as it is hard to know whether a QR code has been tampered with.

This disclosure relates to using multiple machine learning models and a sand-box environment to detect malicious URLs and login pages stored in a QR code. An application on a computing device will augment QR code data stored in a QR code, and the computing device sends the QR code data and computing device metadata to a deep learning computing platform. The QR code data may comprise a uniform resource locator (URL) and communication protocol information. The deep learning computing platform will generate, by multiple machine learning models and a sand-box environment, a sand-box score using the URL, a user-based score using the computing device metadata, and a connections score using the communication protocol information. The deep learning platform then determines whether the computing device should reject and delete the QR code data based on whether the scores are below a pre-determined threshold.

FIG. 1 depicts an illustrative example of computer environment 100 in accordance with one or more illustrative aspects described herein. Computer environment 100 may comprise one or more computing devices and/or computer systems. For example, computing environment 100 may include a deep learning computing platform 110, an enterprise computing infrastructure 120, an enterprise data storage platform 130, user computing device 140, user computing device 150, and user computing device 160. In some arrangements, computer environment 100 may include additional computing devices, computing systems, computing platforms, and networks that are not depicted in FIG. 1.

As illustrated in greater detail below, deep learning computing platform 110 may include one or more computing devices configured to perform one or more of the functions described herein. For example, deep learning computing platform 110 may include one or more computers (e.g., laptop computers, desktop computers, servers, server blades, or the like) and/or other computer components (e.g., processors, memories, communication interfaces).

Enterprise computing infrastructure 120 may be associated with a distinct entity such as a company, enterprise organization and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Enterprise computing infrastructure 120 may include computing hardware and software that may be configured to host, execute, and/or otherwise provide various data or one or more enterprise applications. For example, enterprise computing infrastructure 120 may be configured to host, execute, and/or otherwise provide one or more enterprise mobile application for user devices and/or other programs associated with an enterprise server. In some instances, enterprise computing infrastructure 120 may be configured to provide various enterprise and/or back-office computing functions for an enterprise organization, such as a financial institution. For example, enterprise computing infrastructure 120 may include various servers and/or databases that store and/or otherwise maintain a plurality of training databases for machine learning models and/or other information. In addition, enterprise computing infrastructure 120 may process and/or otherwise execute tasks based on commands and/or other information received from other computer systems included in computing environment 100. Additionally, or alternatively, enterprise computing infrastructure 120 may receive instructions from deep learning computing platform 110 and execute the instructions in a timely manner.

Enterprise data storage platform 130 may include one or more computing devices and/or other computer components (e.g., processors, memories, communication interfaces). In addition, enterprise data storage platform 130 may be configured to store and/or otherwise maintain training data for machine learning models and/or other data and information. Additionally, or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100. In another embodiment, deep learning computing platform 110 may load data from enterprise data storage platform 130, manipulate and/or otherwise process such data, and return modified data and/or other data to deep learning computing platform 110.

User computing device 140, user computing device 150, and user computing device 160 may be personal computing devices (e.g., desktop computer, laptop computer) or mobile computing devices (e.g., smartphone, tablet, wearable device). In addition, user computing devices 140, 150, and 160 may be linked to and/or used by a specific user (who may, e.g., be a customer of an enterprise institution or other organization operating deep learning computing platform 110). User computing devices 140, 150, and 160 may comprise a camera configured to scan a quick response (QR) code. User computing devices 140, 150, and 160 may include computing hardware and software that may be configured to execute and/or otherwise provide various data or one or more enterprise applications. In one embodiment, a user of user computing device 140 may use a camera of user computing device 140 to scan a QR code. User computing device 140 may use an application associated with at least the user computing device 140 and deep learning computing platform 110, that processes the QR code to augment the scanned QR code into QR code data. In one example, the augmented QR code data comprises a uniform resource locator (URL) and communication protocol information.

In another embodiment, user computing devices 140, 150, and 160 are configured to send computing device metadata to the deep learning computing platform 110. For instance, user computing device 140 would send computing device metadata associated with user computing device 140 to the deep learning computing platform 110. In one example, the computing device metadata comprises a location of a user computing device, a timestamp, and an IP address and/or other temporal or operational data associated with a user computing device.

Computing environment 100 also may include one or more networks, which may interconnect one or more of deep learning computing platform 110, enterprise computing infrastructure 120, enterprise data storage platform 130, user computing device 140, user computing device 150, and user computing device 160. For example, computing environment 100 may include a network 170 (which may, e.g., be a public or private network). Network 170 may be a high generation cellular network, such as, for example, a 5G or higher cellular network. In other embodiments, one or more networks of computing environment 100 may also be a global area network (GAN), such as the Internet, a wide area network (WAN), a local area network (LAN), or any other type of network or combination of networks.

In one or more arrangements, deep learning computing platform 110, enterprise computing infrastructure 120, enterprise data storage platform 130, user computing device 140, user computing device 150, user computing device 160, and/or the other systems included in computing environment 100 may be any type of computing device capable of receiving input via a user interface, and communicating the received input to one or more other computing devices. For example, deep learning computing platform 110, enterprise computing infrastructure 120, enterprise data storage platform 130, user computing device 140, user computing device 150, user computing device 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of deep learning computing platform 110, enterprise computing infrastructure 120, enterprise data storage platform 130, user computing device 140, user computing device 150, user computing device 160, may, in some instances, be special-purpose computing devices configured to perform specific functions.

Figure 2A:
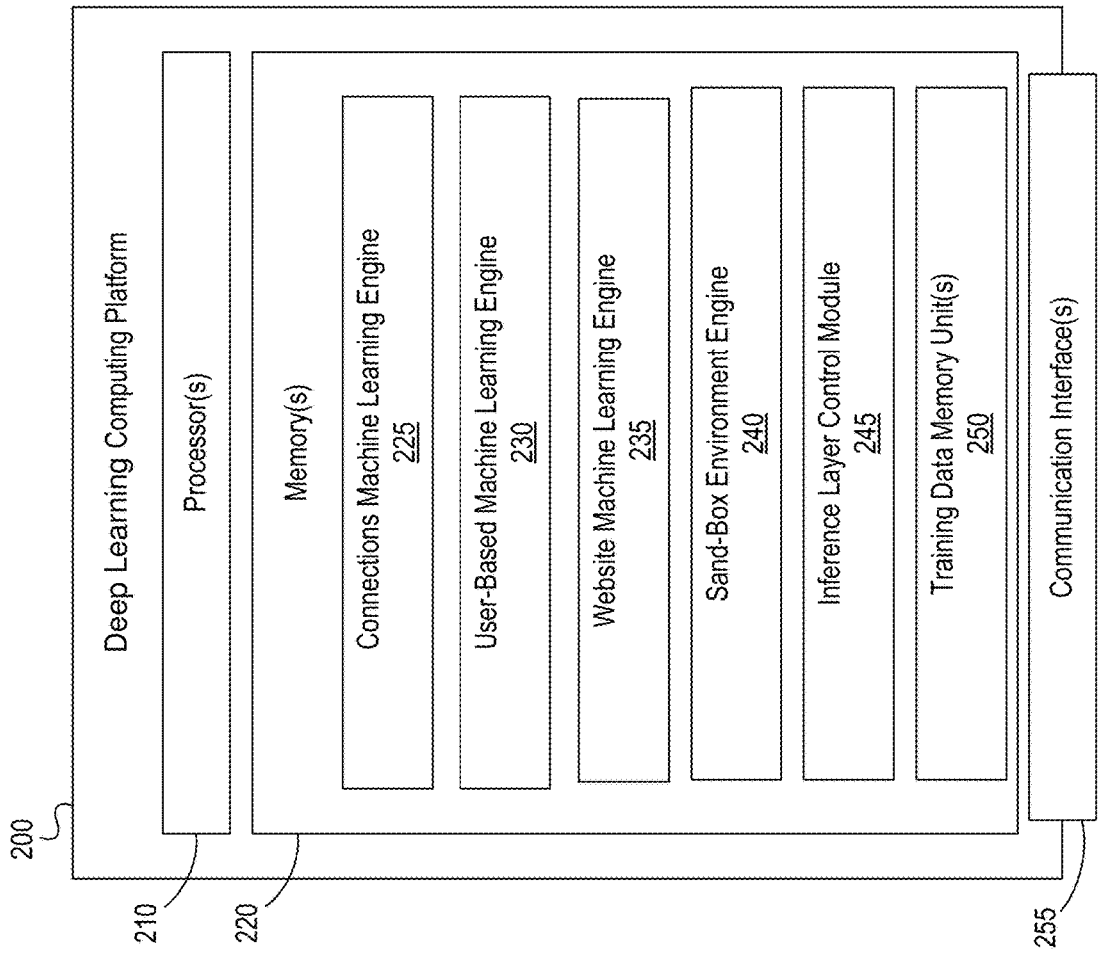
FIGS. 2A-B depict an illustrative example of a deep learning computing platform in accordance with one or more examples described herein.

FIG. 2A depicts an illustrative example of a deep learning computing platform 200 in accordance with one or more examples described herein. Deep learning computing platform 200 may include one or more processors 210, memory(s) 220, and communication interface 255. A data bus may interconnect processor 210, memory 220, and communication interface 255. Communication interface 255 may be a network interface configured to support communication between deep learning computing platform 200 and one or more networks (e.g., a public network, a private network, a local network, or the like). Memory 220 may include one or more program modules having instructions that when executed by processor 210 cause deep learning computing platform 200 to perform one or more functions described herein and/or one or more databases that may store and/or otherwise maintain information which may be used by such program modules and/or processor 210. In some instances, the one or more program modules and/or databases may be stored by and/or maintained in different memory units of deep learning computing platform 200 and/or by different computing devices that may form and/or otherwise make up deep learning computing platform 200. For example, memory 220 may have, store, and/or include a connections machine learning engine 225, a user-based machine learning engine 230, a website machine learning engine 235, a sand-box environment engine 240, an inference layer control module 245, and training data memory unit(s) 250.

Connections machine learning engine 225 may have instructions that direct and/or cause deep learning computing platform 200 to determine, via a connections predictions model and based on communication protocol information, a connections score, as discussed in greater detail below. In some examples, the communication protocol information comprises an IP packet header that may include at least a source IP address and a destination IP address and/or other data. In another example, the communication protocol information comprises (secure sockets layer) SSL or (transport layer security) TLS certificates. User-based machine learning engine 230 may have instructions that direct and/or cause deep learning computing platform 200 to determine, via a user-based prediction model and based on computing device metadata from a computing device, a user-based score, as discussed in greater detail below. For example, the computing device metadata may comprise a location of the computing device, a timestamp, and a device IP address.

Website machine learning engine 235 may have instructions that direct and/or cause deep learning computing platform 200 to determine, via a website prediction model and based on a uniform resource locator (URL), a website score, discussed in greater detail below. Sand-box environment engine 240 may have instructions that direct and/or cause deep learning computing platform 200 to execute a URL in an isolated sand-box environment to generate a sand-box score based on the website score and whether the executed URL matches any known rejected URLs stored in a sand-box training database, as discussed in greater detail below.

Inference layer control module 245 is in communication via a data bus with communication interface 255. When the deep learning computing platform 200 receives QR code data and computing device metadata from a computing device, the communication interface 255 receives the QR code data and computing device metadata and sends both to the inference layer control module 245. The inference layer control module 245 may then translate the QR code data, comprising a URL and communication protocol information, and/or the computing device metadata into a data format usable by the user-based prediction model, connections prediction model, and website prediction model. The inference layer control module 245 sends the communication protocol information to the connections prediction model, sends the URL to sand-box controlling module comprising the website prediction model and sand-box environment, and sends the computing device metadata to the user-based prediction model.

The training data memory units 250 may comprise one or more training databases used by machine learning models in the deep learning computing platform 200. For example, the training data memory units may include a user-based training database, a connections training database, and a sand-box training database. In one example, the user-based training database may include a plurality of known computing device metadata used to train and develop a user-based prediction model. In another example, the connections training database may include a plurality of known communication protocol information used to train and develop a connections prediction model. In another example, the sand-box training database stores a plurality of known rejected and accepted URLs used to train and develop the website prediction model.

Figure 2B:
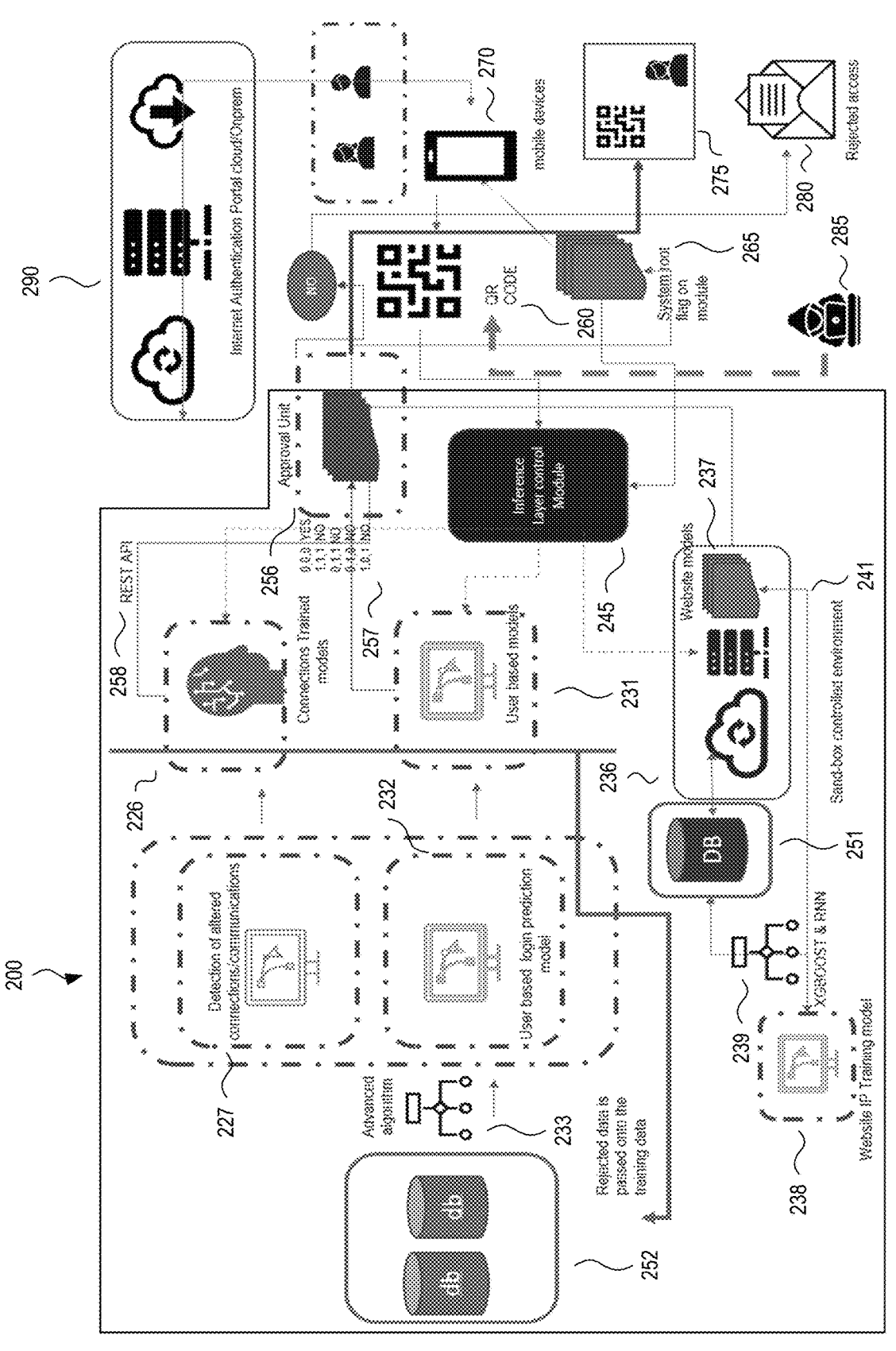

FIG. 2B depicts an illustrative example of a deep learning computing platform 200 in accordance with one or more examples described herein. Deep learning computing platform 200 may include connections trained models 226, a connections prediction model 227, user-based trained models 231, a user-based prediction model 232, a sand-box controlled module 236, website trained models 237, a website prediction model 238, an inference layer control module 245, a sand-box training database 251, one or more training databases 252 that may include a connections training database and a user-based training database, and an approval unit 256. Deep Learning computing platform 200 may be in communication with mobile device 270 through a network that interconnects deep learning computing platform 200 and mobile device 270.

Mobile device 270 may comprise a camera configured to scan a QR code 260. In some embodiments, mobile device 270 is a computing device like a tablet or laptop and/or the like. Most mobile devices and/or computing devices have an in-built QR scanner in their camera. The mobile device 270 also has an application running in the background of the mobile device 270 that detects when QR codes are scanned by the camera. The application is configured to process the QR code 260 to augment the QR code data into a URL and communication protocol information associated with the QR code 260. The application may also have a system root on flag module 265. The system root on flag module 265 generates a restriction flag when the application detects when a QR code is scanned by the mobile device 270. The application sends the restriction flag to the system root of the mobile device 270 which causes the mobile device 270 to restrict access to any code or installation that may run on the mobile device 270. This restricts the possibility that the QR code data, which may have been tampered with by a malicious attacker 285, does not harm the mobile device 270 while the deep learning computing platform 200 determines whether the QR code data is secure and trusted. The mobile device 270 sends the augmented QR code data and computing device metadata to the deep learning computing platform 200.

When the deep learning computing platform 200 receives QR code data and computing device metadata from a mobile device 270, the communication interface 255 receives the QR code data and computing device metadata and sends both to the inference layer control module 245. The inference layer control module 245 may then translate the QR code data, comprising a URL and communication protocol information, and/or the computing device metadata into a data format usable by the user-based prediction model 232, connections prediction model 227, and website prediction model 238. The inference layer control module 245 sends the communication protocol information to the connections prediction model 227, sends the URL to sand-box controlling module 236 comprising the website prediction model 238 and sand-box environment 241, and sends the computing device metadata to the user-based prediction model 232.

The connections prediction model 227, user-based prediction model 232, and website prediction model 238 may be any machine learning model including xgboosted decision trees, auto-encoders, perceptron, decision trees, support vector machines, regression, and/or a neural network. The neural network may be any type of neural network including a feed forward network, radial basis network, recurrent neural network, long/short term memory, gated recurrent unit, auto encoder, variational autoencoder, convolutional network, residual network, Kohonen network, and/or other type.

Sand-box controlled module 236 receives the URL from the inference layer control module 245. The website prediction model 238 may generate a website score using the URL. The website prediction model 238 is trained on known rejected and accepted URLs in the sand-box training database 251. Known rejected URLs are URLs formerly used by the website prediction model 238 to generate a website score that are stored in the sand-box training database 251 if the approval unit generates a rejection flag when determining if the sand-box score, user-based score, and connections score are below a pre-determined threshold as discussed below. Known accepted URLs are URLs the deep learning platform has accepted as secure and trusted. There may also be other website trained models 237 in the sand-box controlled module 236. In some examples, the website score is a 1 if the URL is predicted as secure and trusted. In some examples, the website score is a 0 if the URL is potentially malicious.

In some examples, the website prediction model 238 uses XGBoost or a recurrent neural network (RNN) 239 to generate the website score. XGBoost is a supervised learning algorithm that combines outputs from multiple weaker models in a gradient boosted tree algorithm that regularizes an objective function while minimizing a loss function when adding new models. A number of decision trees may be used in XGBoost that that are trained on subsets of data to make predictions that are combined into a final prediction or output. RNNs are typically used with a long-short-term-memory (LTSM) that allows the RNN to store outputs from previous learned processed inputs. An RNN may consist of multiple layers and as the inputted data is processed at each layer, the previous outputs from a previous layer are used by the current layer to process the current input and generate an output.

Once the website score is generated by the website prediction model 238, the sand-box environment 241 executes the URL and generates a sand-box score based on the website score and whether the executed URL matches a known rejected URLs stored in the sand-box training database 251. In some examples, the sand-box environment is an isolated environment or virtual machine in which potentially malicious URLs and login pages can execute without access to any other resources or applications on the deep learning computing platform 200. In one example, if the website score is below a pre-determined threshold, and the URL does not match with any known rejected URLs in the sand-box training database, the sand-box score is a 0. In another example, if the website score is above a pre-determined threshold and the URL matches any known rejected URLs in the sand-box training database, the sand-box score is a 0. In another example, if the website score is above a pre-determined threshold and the URL does not match any known rejected URLs in the sand-box training database, the sand-box score is a 1. The sand-box controlled module 236 sends the sand-box score to the approval unit 256.

In some embodiments, if the sand-box controlled module cannot generate a sand-box score then the QR code data and computing device metadata is sent to review queue 275 for manual review.

Connections prediction model 227 receives the communication protocol information from the inference layer control module 245. The connections prediction model 227 may generate a connections score using the communication protocol information. The connections prediction model 227 is trained on known communication protocol information stored in a connections database in one or more training databases 252. Known communication protocol information may be rejected communication protocol information formerly used by the website prediction model 227 to generate a connections score that are stored in the connections training database if the approval unit generates a rejection flag when determining if the sand-box score, user-based score, and connections score are below a pre-determined threshold as discussed below. Known communication protocol information may also be accepted communication protocol information the deep learning platform has accepted as secure and trusted. There may also be other connections trained models 226. In some examples, the connections score is a 1 if the communication protocol information is predicted as secure and trusted. In some examples, the connections score is a 0 if the communication protocol is potentially malicious. The connections prediction model 227 sends the connections score to the approval unit 256.

In some examples, the communication protocol information comprises data from various layers in a communication model like open system interconnection (OSI), and/or transmission control protocol (TCP)/internet protocol (IP) associated with the URL and QR code data. Both the OSI and TCP/IP models allow for systems to interconnect and communicate with each other that may comprise multiple layers specifying how packets and data are transferred from system to system over a network. In the OSI model, there are seven layers that may comprise an application layer, a presentation layer, a session layer, a transport layer, a network layer, a data link layer, and a physical layer. The TCP-IP model may comprise four layers including an application layer, a transport layer, a network layer, and a network interface layer. In some examples, the communication protocol information comprises an IP packet header that include at least a source IP address and a destination IP address. The source and destination IP address may be used as inputs in the connections prediction model to predict whether the communication protocol information is secure and trusted. In another example, the communication protocol information may comprise secure socket layer (SSL) or transport layer security (TLS) certificates. The SSL and TLS security certificates may be used as inputs in the connections prediction model to predict whether encryption by the SSL and TLS certificates are secure and trusted encryption mechanisms.

User-based prediction model 232 receives the computing device metadata from the inference layer control module 245. The user-based prediction model 232 may generate a user-based score using the computing device metadata. The user-based prediction model 232 is trained on known computing device metadata stored in a user-based training database in one or more training databases 252. Known computing device metadata may be rejected computing device metadata formerly used by the user-based prediction model 232 to generate a user-based score that are stored in the user-based training database if the approval unit generates a rejection flag when determining if the sand-box score, user-based score, and connections score are below a pre-determined threshold as discussed below. Known computing device metadata may also be accepted computing device metadata the deep learning platform has accepted as secure and trusted. There may also be other user-based trained models 231. In some examples, the user-based score is a 1 if the computing device metadata is predicted as secure and trusted. In some examples, the user-based score is a 0 if the computing device metadata is potentially malicious. The user-based prediction model 232 sends the user-based score to the approval unit 256.

In some examples, the computing device metadata comprises a location of the mobile device 270 (or a computing device), a timestamp, and a device IP address. The location of the mobile device 270 (or computing device), timestamp, and device IP address may be used as inputs in the user-based prediction model to predict whether the computing device metadata is secure and trusted. In some examples, the computing device metadata comprises additional temporal or operational metadata of the mobile device 270 (or computing device).

In one embodiment, the connections score, user-based score and sand-box score are communicated from the connections prediction model 226, user-based prediction model 231, and website prediction model 236 to the approval unit 256 using a RESTful or REST (Representational State Transfer) Application programming interface (API) 258. The REST API 258 uses a protocol used by the deep learning computing platform to Create, Read, Update, and Delete data from various modules and models in the deep learning computing platform 200. For example, the deep learning computing platform 510 may use the REST API to send and receive data between different modules and models in a consistent and standard format.

The approval unit 256 then receives the sand-box score, user-based score, and connections score. The approval unit 256 determines if at least one of the sand-box score, connections score, and user-based score, or a combination thereof, is below or above a pre-determined threshold. In some examples, the pre-determined threshold is 0.9 and the sand-box score, user-based score, and connections score are either a 0 or a 1. If at least one of the sand-box score, connections score, and user-based score, or a combination thereof, is below a pre-determined threshold, the approval unit 256 generates a rejection flag. The deep learning computing platform 200 sends the rejected flag to the mobile device 270. The mobile device 270 receives the rejected flag that causes the mobile device 270 to delete the QR code data before causing the restriction flag to be removed from the system root of the mobile device 270 so that access to the mobile device 270 is no longer restricted. In, some examples, the mobile device 270 is restricted from running or accessing any code and/or installation while the restriction flag is stored in the system root.

In some embodiments, the rejected flag causes the mobile device 270 (or computing device) to generate a rejected message 280 on a graphical user interface (GUI) of the mobile device 270 indicating the QR code data is rejected and potentially malicious.

In some embodiments, the connections protocol information is then sent to the connections training database. The deep learning computing 200 platform updates and adds the communication protocol information to the connections training database. The connections prediction model 227 is re-developed by training the connections prediction model 227 based on the connections training database. The computing device metadata is sent to a user-based training database. The deep learning computing platform 200 updates and adds the computing device metadata to the user-based training database. The user-based prediction model 232 is re-developed by training the user-based prediction model 232 based on the user-based training database. The URL is sent to the sand-box training database 251. The deep learning computing platform 200 updates and adds the URL to the sand-box training database 251. The website prediction model 238 is re-developed by training the website prediction model 238 based on the sand-box training database 251.

In another embodiment, if each one of the sand-box score, connections score, and user-based score, are above a pre-determined threshold, the approval unit 256 generates an accepted flag and sends it to the mobile device 270. The accepted flag causes the restriction flag to be removed from the system root of the mobile device 270 and allows the mobile device 270 to execute the URL in the QR code data and for the mobile device 270 to connect to an internet authentication portal cloud 290 and/or on-premise network. In one example, the sand-box score, connections score, and user-based score must all be a 1 and above a pre-determined threshold of 0.9, so all the scores read out as 111 for the accepted flag to be generated. In a different example, the combination of scores 257 all read out as 000 and are below a pre-determined threshold for the accepted flag to be generated.

Figure 3:
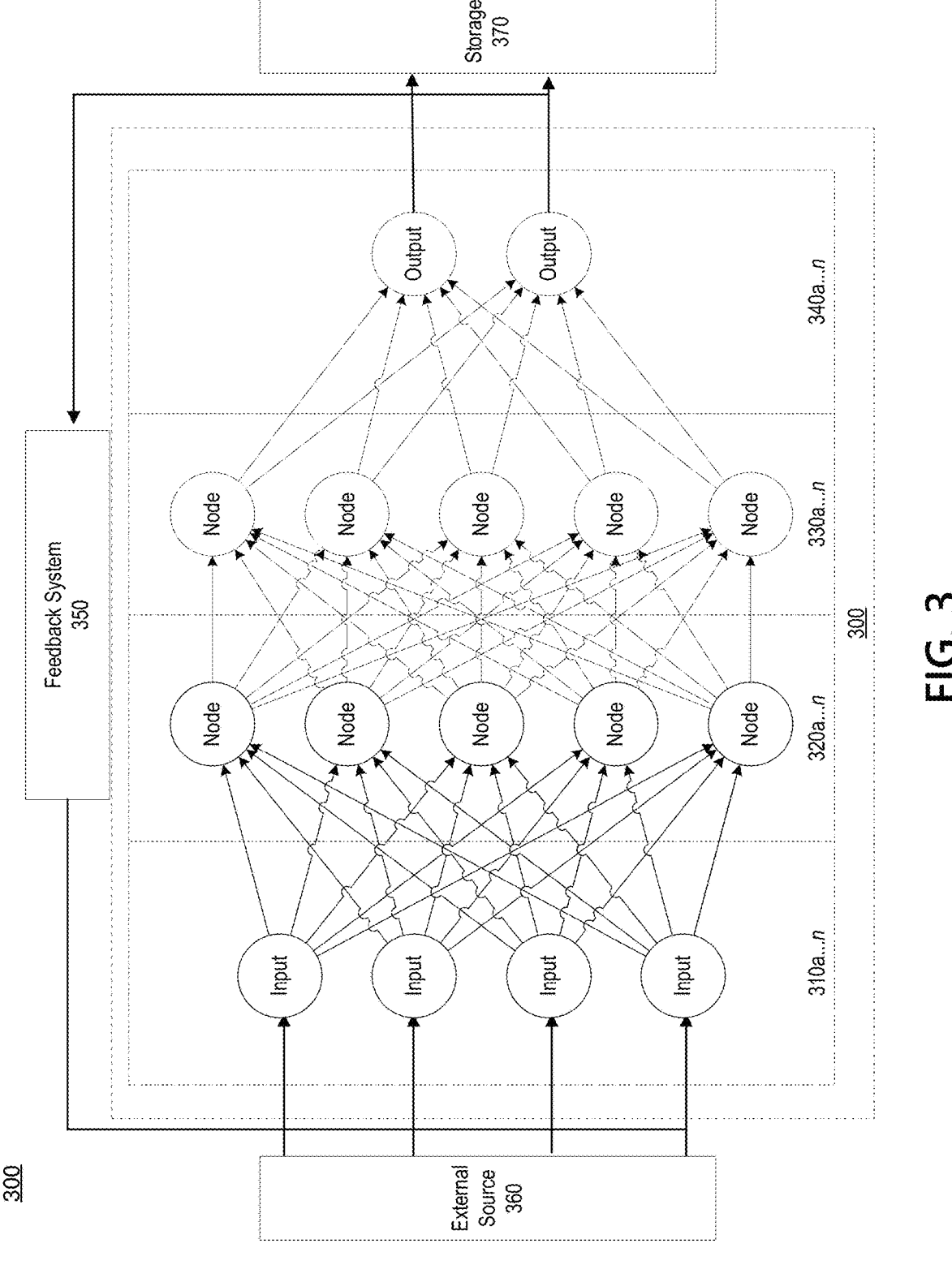
FIG. 3 depicts an illustrative artificial neural network on which one or more machine learning algorithms may be executed in accordance with one or more examples described herein.

FIG. 3 illustrates a simplified example of an artificial neural network 300 on which a machine learning algorithm may be executed. FIG. 3 is merely an example of nonlinear processing using an artificial neural network; other forms of nonlinear processing may be used to implement a machine learning algorithm in accordance with features described herein.

By way of background, a framework for machine learning algorithm may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks. Such structures, while significantly more complex than conventional computer systems, are beneficial in implementing machine learning. For example, an artificial neural network may be comprised of a large set of nodes which, like neurons in humans, may be dynamically configured to effectuate learning and decision-making.

Machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator. An embodiment involving unsupervised machine learning is described herein.

Meanwhile, in supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of photos with labeled human faces and 10,000 random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "75% correct"). An embodiment involving supervised machine learning is described herein.

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

As elaborated herein, in practice, machine learning systems and their underlying components are tuned by data scientists to perform numerous steps to perfect machine learning systems and models. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals more clear, given the nearly infinite number of variables that can possible be optimized in the machine learning system. Meanwhile, one or more of data integration, selection, cleaning, and/or pre-processing steps can sometimes be the most time consuming because the old adage, "garbage in, garbage out," also reigns true in machine learning systems.

In FIG. 3, each of input nodes 310a-n is connected to a first set of processing nodes 320a-n. Each of the first set of processing nodes 320a-n is connected to each of a second set of processing nodes 330a-n. Each of the second set of processing nodes 330a-n is connected to each of output nodes 340a-n. Though only two sets of processing nodes are shown, any number of processing nodes may be implemented. Similarly, though only four input nodes, five processing nodes, and two output nodes per set are shown in FIG. 3, any number of nodes may be implemented per set. Data flows in FIG. 3 are depicted from left to right: data may be input into an input node, may flow through one or more processing nodes, and may be output by an output node. Input into the input nodes 310a-n may originate from an external source 360. Output may be sent to a feedback system 350 and/or to storage 370. The feedback system 350 may send output to the input nodes 310a-n for successive processing iterations with the same or different input data.

In one illustrative method using feedback system 350, the system may use machine learning to determine an output. The output may include anomaly scores, heat scores/values, confidence values, and/or classification output. The system may use any machine learning model including xgboosted decision trees, auto-encoders, perceptron, decision trees, support vector machines, regression, and/or a neural network. The neural network may be any type of neural network including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. For example, when training the neural network, the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting-regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially.

In one example, FIG. 3 depicts nodes that may perform various types of processing, such as discrete computations, computer programs, and/or mathematical functions implemented by a computing device. For example, the input nodes 310*a-n* may comprise logical inputs of different data sources, such as one or more data servers. The processing nodes 320*a-n* may comprise parallel processes executing on multiple servers in a data center. And, the output nodes 340*a-n* may be the logical outputs that ultimately are stored in results data stores, such as the same or different data servers as for the input nodes 310*a-n*. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 300 may learn and/or be dynamically reconfigured. Though nodes are depicted as having connections only to successive nodes in FIG. 3, connections may be formed between any nodes. For example, one processing node may be configured to send output to a previous processing node.

Input received in the input nodes 310*a-n* may be processed through processing nodes, such as the first set of processing nodes 320*a-n* and the second set of processing nodes 330*a-n*. The processing may result in output in output nodes 340*a-n*. As depicted by the connections from the first set of processing nodes 320*a-n* and the second set of processing nodes 330*a-n*, processing may comprise multiple steps or sequences. For example, the first set of processing nodes 320*a-n* may be a rough data filter, whereas the second set of processing nodes 330*a-n* may be a more detailed data filter.

The artificial neural network 300 may be configured to effectuate decision-making. As a simplified example for the purposes of explanation, the artificial neural network 300 may be configured to detect objects in photographs. The input nodes 310*a-n* may be provided with a digital copy of a photograph. The first set of processing nodes 320*a-n* may be each configured to perform specific steps to remove non-object content, such as large contiguous sections of the color blue in the background of the photograph. The second set of processing nodes 330*a-n* may be each configured to look for rough approximations of objects, such as object shapes and color tones. Multiple subsequent sets may further refine this processing, each looking for further more specific tasks, with each node performing some form of processing which need not necessarily operate in the furtherance of that task. The artificial neural network 300 may then predict the location and/or label (i.e. what kind of object) of the object in the photograph. The prediction may be correct or incorrect.

The feedback system 350 may be configured to determine whether or not the artificial neural network 300 made a correct decision. Feedback may comprise an indication of a correct answer and/or an indication of an incorrect answer and/or a degree of correctness (e.g., a percentage). For example, in the object recognition example provided above, the feedback system 350 may be configured to determine if the object was correctly identified and, if so, what percentage of the object was correctly identified. The feedback system 350 may already know a correct answer, such that the feedback system may train the artificial neural network 300 by indicating whether it made a correct decision. The feedback system 350 may comprise human input, such as an administrator telling the artificial neural network 300 whether it made a correct decision. The feedback system may provide feedback (e.g., an indication of whether the previous output was correct or incorrect) to the artificial neural network 300 via input nodes 310*a-n* or may transmit such information to one or more nodes. The feedback system 350 may additionally or alternatively be coupled to the storage 370 such that output is stored. The feedback system may not have correct answers at all, but instead base feedback on further processing: for example, the feedback system may comprise a system programmed to identify objects, such that the feedback allows the artificial neural network 300 to compare its results to that of a manually programmed system.

The artificial neural network 300 may be dynamically modified to learn and provide better input. Based on, for example, previous input and output and feedback from the feedback system 350, the artificial neural network 300 may modify itself. For example, processing in nodes may change and/or connections may be weighted differently. Following on the example provided previously, the object prediction may have been incorrect because the photos provided to the algorithm were tinted in a manner which made all objects look blue. As such, the node which excluded sections of photos containing large contiguous sections of the color blue could be considered unreliable, and the connections to that node may be weighted significantly less. Additionally, or alternatively, the node may be reconfigured to process photos differently. The modifications may be predictions and/or guesses by the artificial neural network 300, such that the artificial neural network 300 may vary its nodes and connections to test hypotheses.

The artificial neural network 300 need not have a set number of processing nodes or number of sets of processing nodes, but may increase or decrease its complexity. For example, the artificial neural network 300 may determine that one or more processing nodes are unnecessary or should be repurposed, and either discard or reconfigure the processing nodes on that basis. As another example, the artificial neural network 300 may determine that further processing of all or part of the input is required and add additional processing nodes and/or sets of processing nodes on that basis.

The feedback provided by the feedback system 350 may be mere reinforcement (e.g., providing an indication that output is correct or incorrect, awarding the machine learning algorithm a number of points, or the like) or may be specific (e.g., providing the correct output). For example, the machine learning algorithm 300 may be asked to detect faces in photographs. Based on an output, the feedback system 350 may indicate a score (e.g., 75% accuracy, an indication that the guess was accurate, or the like) or a specific response (e.g., specifically identifying where the face was located).

The artificial neural network 300 may be supported or replaced by other forms of machine learning. For example, one or more of the nodes of artificial neural network 300 may implement a decision tree, associational rule set, logic programming, regression model, cluster analysis mechanisms, Bayesian network, propositional formulae, generative models, and/or other algorithms or forms of decision-making. The artificial neural network 300 may effectuate deep learning.

In another example, an unsupervised machine learning engine may use an autoencoder technique to detect anomalies within the graph. The autoencoder may be constructed with a number of layers that represent the encoding portion of the network and a number of layers that represent the decoding portion of the network. The encoding portion of the network may output a vector representation of inputs into the encoder network, and the decoding portion of the network may receive as input a vector representation generated by the encoding portion of the network. It may then use the vector representation to recreate the input that the encoder network used to generate the vector representation.

The autoencoder may be trained on historical data or feature vectors that are known to not be fraudulent. By training on non-fraudulent feature vectors, the autoencoder may learn how a non-fraudulent entity behaves. When the autoencoder encounters a feature vector that is different from the feature vectors it has trained on, the unsupervised machine learning engine may flag the feature vector as potentially fraudulent.

The autoencoder may be a variational autoencoder, in some examples. The variational autoencoder may include the components of the autoencoder. The variational autoencoder may also include a constraint on its encoding network that forces it to generate vector representations of inputs according to a distribution (e.g., a unit Gaussian distribution).

Figure 4:
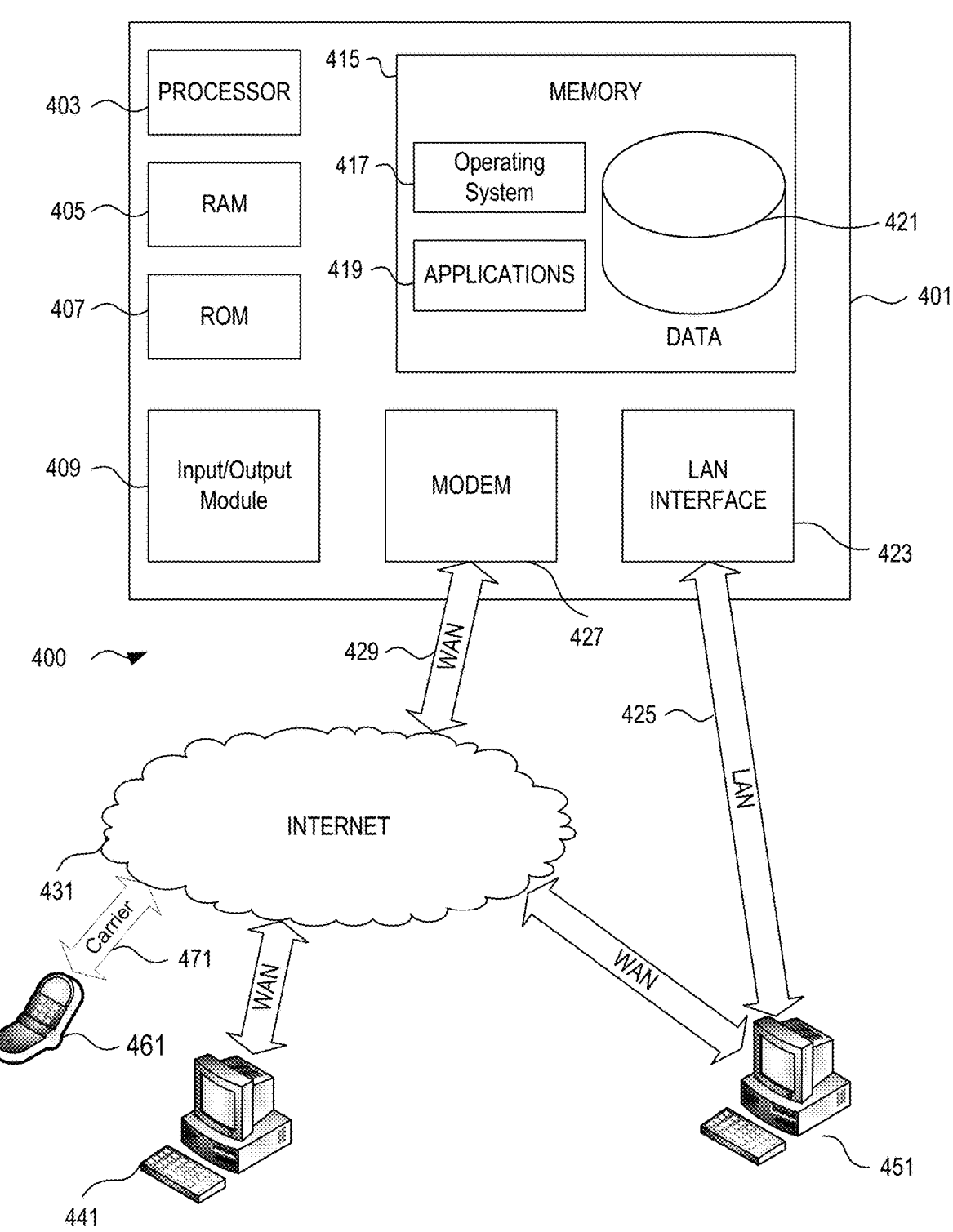
FIG. 4 depicts an illustrative example of a suitable computing system environment that may be used in accordance with one or more illustrative aspects described herein.

FIG. 4 illustrates an example of a computing system environment 400 that may be used according to one or more illustrative embodiments. The computing system environment 400 is only one example of a suitable computing environment and is not intended to suggest any limitation as to the scope of use or functionality contained in the disclosure. The computing system environment 400 should not be interpreted as having any dependency or requirement relating to any one or combination of components shown in the computing system environment 400.

The disclosure is operational with numerous other general purpose or special purpose computing system environments or configurations. Examples of well known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 4, the computing system environment 400 may include a computing device 401 wherein the processes discussed herein may be implemented. The computing device 401 may have a processor 403 for controlling overall operation of the computing device 401 and its associated components, including random-access memory (RAM) 405, read-only memory (ROM) 407, input/output module or communications module 409, and memory 415. Computing device 401 typically includes a variety of computer readable media. Computer readable media may be any available media that may be accessed by computing device 401 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 401.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 400 may also include optical scanners (not shown). Exemplary usages include scanning and converting paper documents, e.g., correspondence, receipts to digital files.

Although not shown, RAM 405 may include one or more applications representing the application data stored in RAM 405, while the computing device is on and corresponding software applications (e.g., software tasks) are running on the computing device 401.

Communications module 409 may include a microphone, keypad, touch screen, and/or stylus through which a user of computing device 401 may provide input, and may also include one or more of a speaker for providing audio output and a video display device for providing textual, audiovisual and/or graphical output.

Software may be stored within memory 415 and/or storage to provide instructions to processor 403 for enabling computing device 401 to perform various functions. For example, memory 415 may store software used by the computing device 401, such as an operating system 417, application programs 419, and an associated database 421. Also, some or all of the computer executable instructions for computing device 401 may be embodied in hardware or firmware.

Computing device 401 may operate in a networked environment supporting connections to one or more remote computing devices, such as computing devices 441, 451, and 461. The computing devices 441, 451, and 461 may be personal computing devices or servers that include many or all of the elements described above relative to the computing device 401. Computing device 461 may be a mobile device communicating over wireless carrier channel 471.

The network connections depicted in FIG. 4 include a local area network (LAN) 425 and a wide area network (WAN) 429, but may also include other networks. When used in a LAN networking environment, computing device 401 may be connected to the LAN 425 through a network interface, such as LAN interface 423, or to an adapter in the communications module 409. When used in a WAN networking environment, the computing device 401 may include a modem in the communications module 409, a modem separate from the communications module 409, such as modem 427, or other means for establishing communications over the WAN 429, such as the Internet 431 or other type of computer network. It will be appreciated that the network connections shown are illustrative and other means of establishing a communication link between the computing devices may be used. Various well-known protocols such as TCP/IP, Ethernet, FTP, HTTP and the like may be used, and the system can be operated in a client-server or in Distributed Computing configuration to permit a user to retrieve web pages from a web-based server. Any of various conventional web browsers can be used to display and manipulate data on web pages.

Additionally, one or more application programs 419 used by the computing device 401, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 401. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 401. Such a processor may execute computer-executable instructions stored on a computer-readable medium. In an example, the systems and apparatus described herein may correspond to the computing device 401. A computer-readable medium (e.g., ROM 407) may store instructions that, when executed by the processor 403, may cause the computing device 401 to perform the functions as described herein.

Figure 5A:
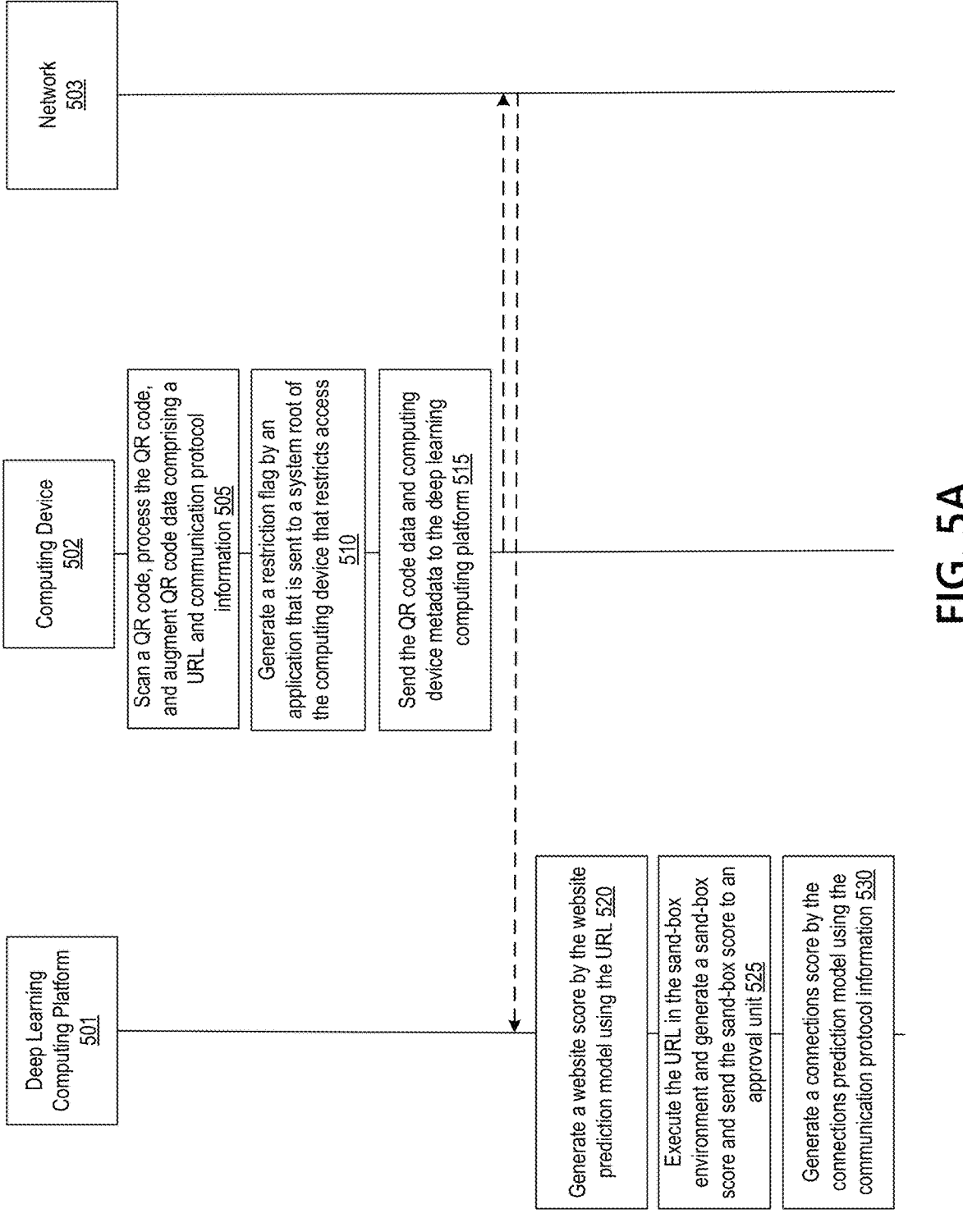
FIG. 5A-B depict illustrative event sequences in accordance with one or more illustrative aspects described herein.
Figure 5B:
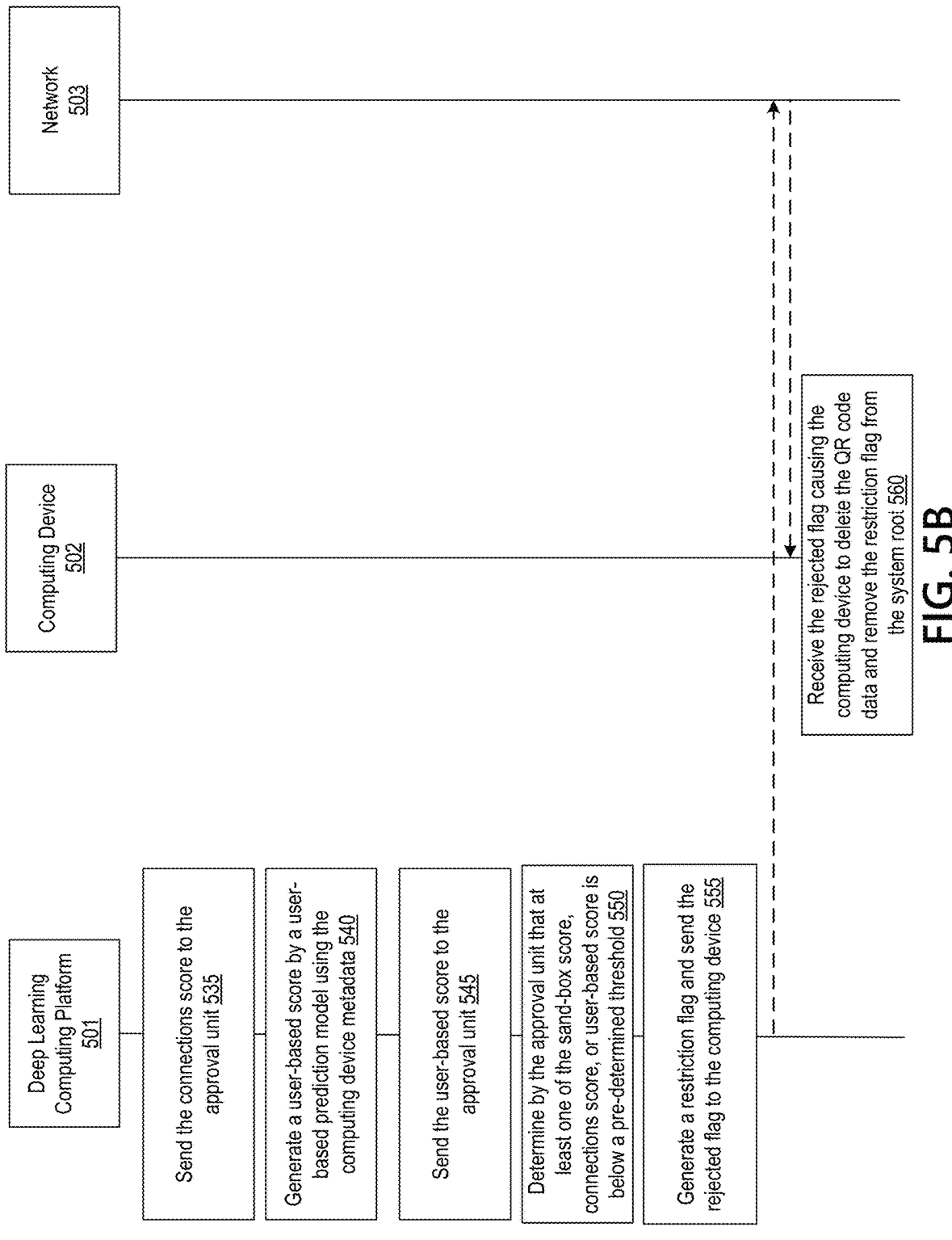

FIGS. 5A and 5B depict an illustrative event sequence in accordance with one or more illustrative aspects described herein. Referring to FIG. 5A, at step 505, the computing device 502 comprises a camera configured to scan a QR code, the QR code is processed by an application running in the background of the computing device 502 and the QR code data is augmented. The augmented QR code data comprises a URL and communication protocol information. At step 510, the application generates a restriction flag that is sent to the system root of the computing device which causes the computing device to restrict access. At step 515, the computing device 502 sends the QR code data and computing device metadata to a deep learning computing platform 501 via the network 503. At step 520, a sand-box controlled module comprising a website prediction model and a sand-box environment, receives the URL and the website prediction model generates a website score using the URL. At step 525, the sand-box environment executes the URL and generates a sand-box score based on the website score and whether the URL matches with any known rejected URLs in a sand-box training database. The sand-box controlled module sends the sand-box score to an approval unit. At step 530, a connections prediction model receives the communication protocol information and uses the communication protocol information to generate a connections score.

Referring to FIG. 5B, at step 535, the connections prediction model sends the connections score to the approval unit. At step 540, a user-based prediction model receives the computing device metadata and generates a user-based score using the computing device metadata. At step 545, the user-based prediction model sends the user-based score to an approval unit. At step 550, the approval unit determines that at least one of the sand-box score, connections score, or user-based score, or a combination thereof, is below a pre-determined threshold. At step 555, the approval unit generates a rejected flag. The deep learning computing platform 501 sends to the rejected flag to the computing device 502 via the network 503. At step 560, the computing device 502 receives the rejected flag causing the computing device to delete the QR code data before removing the restriction flag from the system root that cause the computing device to not restrict access to code or installation from running on the computing device 502.

Figure 6:
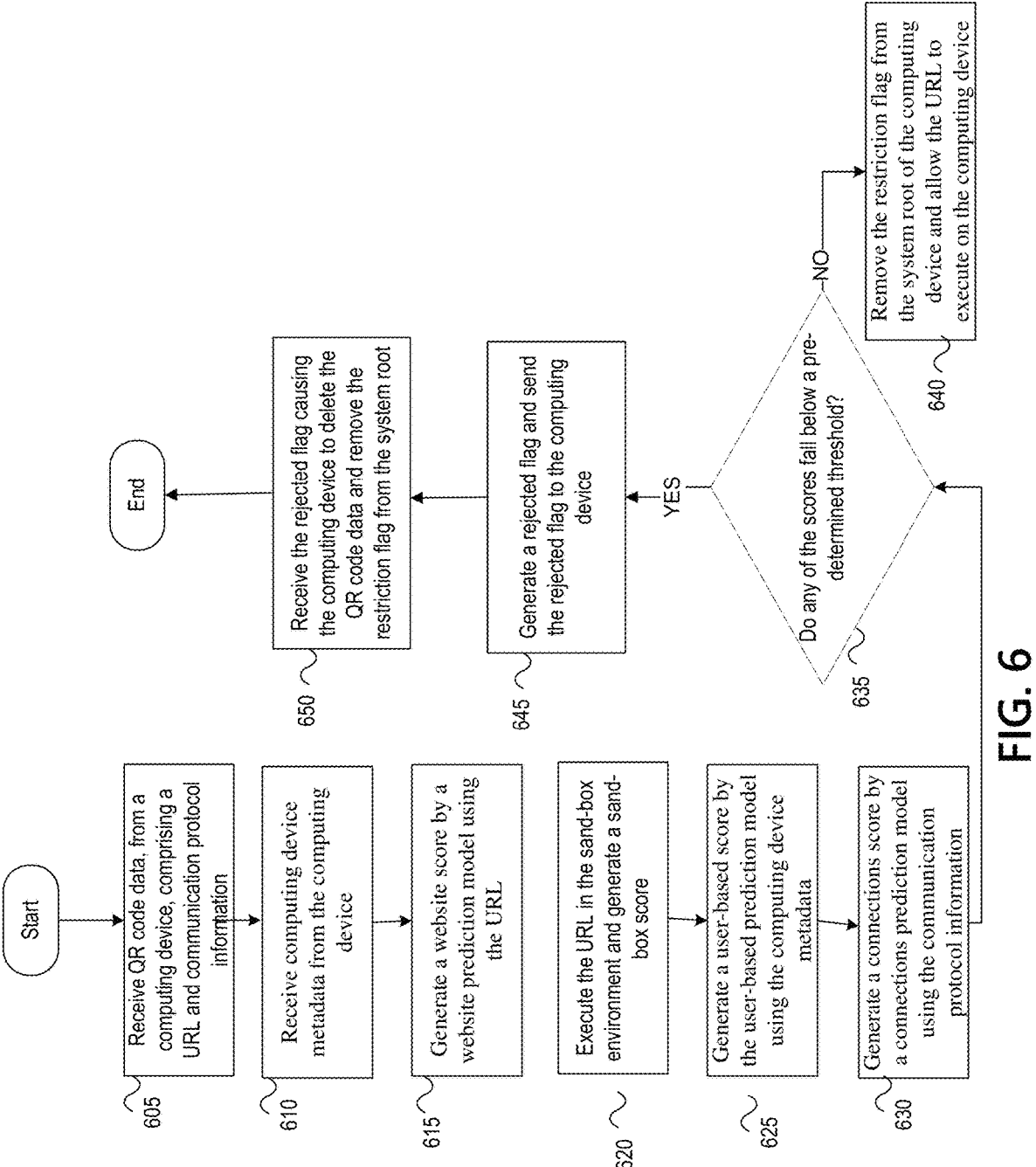
FIG. 6 shows an illustrative flowchart in accordance one or more illustrative aspects described herein.

FIG. 6 shows an illustrative flowchart in accordance one or more illustrative aspects described herein. Referring to FIG. 6, at step 605, a deep learning computing platform receives QR code data, comprising a URL and communication protocol information, from a computing device. Also, an application running in the background of the computing device detects that a QR code was scanned by the computing device and generates a restriction flag. The restriction flag is sent to the system root of the computing device and restricts access of the computing device. At step 610, the deep learning computing platform receives computing device metadata from a computing device. At step 615, a sand-box controlled module comprising a website prediction model and a sand-box environment, receives the URL and the website prediction model generates a website score using the URL. At step 620, the sand-box environment executes the URL and generates a sand-box score based on the website score and whether the URL matches with any known rejected URLs in a sand-box training database. The sand-box controlled module sends the sand-box score to an approval unit. At step 625, a user-based prediction model receives the computing device metadata and generates a user-based score using the computing device metadata. The user-based prediction model sends the user-based score to an approval unit. At step 630, a connections prediction model receives the communication protocol information and uses the communication protocol information to generate a connections score. The connections prediction model sends the connections score to the approval unit.

At step 635, the approval unit determines if any of the sand-box score, user-based score, or connections score, or a combination thereof, fall below a pre-determined threshold. If no, then proceed to step 640 and if yes then proceed to step 645. At step 640, the restriction flag is removed from the system root of the computing device and allows the URL in the QR code data to execute on the computing device.

At step 645, the approval unit generates a rejected flag and the deep learning computing platform sends the rejected flag to the computing device. At step 650, the computing device receives the rejected flag causing the computing device to delete the QR code data before removing the restriction flag from the system root that cause the computing device to not restrict access to code or installation from running on the computing device.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims. One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system comprising:
a deep learning computing platform for detecting malicious URLs associated with a quick response (QR) code, comprising:
at least one processor; and
memory storing computer-readable instructions that, when executed by the at least one processor, cause the deep learning computing platform to:
receive, by a sand-box controlled module comprising a sand-box environment and a website prediction model, and based on a scan of a QR code, QR code data from a computing device associated with an application, wherein the QR code data comprises a uniform resource locator (URL) associated with a login page and communication protocol information, wherein the application is configured to generate and send, based on the scan of the QR code, a restriction flag to a system root of the computing device that causes the computing device to restrict access while determining whether the URL is malicious;
receive, from the computing device, computing device metadata, wherein the computing device metadata comprises a location of the computing device, a timestamp, and a device IP address;
generate a website score, by the website prediction model, using the URL;
execute the URL in the sand-box environment and generate a sand-box score based on a comparison of the website score to a threshold and whether the executed URL matches a known rejected URL stored in a sand-box training database, wherein the sand-box score is determined to be:
a first value when the website score is below the threshold and the executed URL does not match a known rejected URL stored in the sand-box training database or the website score is above the threshold and the URL matches a known rejected URL stored in the sand-box training database; and
a second value when the website score is above the threshold and the URL does not match a known rejected URL stored in the sand-box training database;
send the sand-box score, by the sand-box controlled module, to an approval unit;
send the communication protocol information to a connections prediction model;
generate a connections score, by the connections prediction model, using the communication protocol information;
send the connections score to the approval unit;
send the computing device metadata to a user-based prediction model;

generate a user-based score, by the user-based prediction model, using the computing device metadata;

send the user-based score to the approval unit;

determine, by the approval unit, that at least one of the sand-box score, connections score, or user-based score, or combination thereof, is below a pre-determined threshold;

generate, by the approval unit, a rejected flag; and send the rejected flag to the computing device, wherein the rejected flag causes the computing device to delete the QR code data before causing the restriction flag to be removed so that the access to the computing device is no longer restricted.

2. The system of claim 1, wherein the memory of the deep learning computing platform stores additional computer-readable instructions that, when executed by the at least one processor, cause the deep learning computing platform to:

train and develop the website prediction model based on the sand-box training database, wherein the sand-box training database stores a plurality of known accepted and rejected URLs;

train and develop the user-based prediction model based on a user-based training database, wherein the user-based training database stores a plurality of known computing device metadata; and train and develop the connections prediction model based on a connections database, wherein the connections database stores a plurality of known communication protocol information.

3. The system of claim 1, wherein the memory of the deep learning computing platform stores additional computer-readable instructions that, when executed by the at least one processor, cause the deep learning computing platform to:

send the communication protocol information to a connections training database;

update and add the communication protocol information to the connections training database;

train the connections prediction model based on the connections training database, wherein the connections prediction model is re-developed;

send the computing device metadata to a user-based training database;

update and add the computing device metadata to the user-based training database;

train the user-based prediction model based on the user-based training database, wherein the user-based prediction model is re-developed;

send the URL to a sand-box training database;

update and add the URL to the sand-box training database; and train the website prediction model based on the sand-box training database, wherein the website prediction model is re-developed.

4. The system of claim 1, wherein the deep learning computing platform further comprises a camera, wherein the camera is configured to scan the QR code, wherein the application is configured to process the QR code to augment the QR code data, and wherein the memory comprises computer-readable instructions that, when executed by the at least one processor, cause the deep learning computing platform:

receive, from the computing device, the augmented QR code data.

5. The system of claim 1, wherein the memory of the deep learning computing platform stores additional computer-readable instructions that, when executed by the at least one processor, cause the deep learning computing platform to:

if the sand-box controlled module is not able to generate a sand-box score, then add the QR code data and computing device metadata to a review queue for manual review.

6. The system of claim 1, wherein the communication protocol information comprises an IP packet header that comprises at least a source IP address and a destination IP address.

7. The system of claim 1, wherein the communication protocol information comprises secure sockets layer (SSL) or transport layer security (TLS) certificates.

8. The system of claim 1, wherein the rejected flag causes the computing device to generate a message on a graphical user interface (GUI) of the computing device that indicates the QR code data is rejected and potentially malicious.

9. The system of claim 1, wherein the restriction flag causes the computing device to restrict access to any code or installation that may run on the computing device.

10. The system of claim 1, wherein the computing device is a smart phone, tablet, smart watch, or mobile device.

11. A method for detecting malevolent QR codes used to phish personal information from a user of a computing device, comprising:

at a deep learning computing platform comprising at least one processor and memory:

receiving, by a sand-box controlled module comprising a sand-box environment and a website prediction model, and based on a scan of a QR code, QR code data from the computing device associated with an application, wherein the QR code data comprises a uniform resource locator (URL) associated with a login page and communication protocol information;

receiving, from the computing device, computing device metadata;

generating and sending, by the application, a restriction flag to a system root of the computing device that causes the computing device to restrict access while determining whether the URL is malicious;

generating a website score, by the website prediction model, using the URL;

executing the URL in the sand-box environment;

generating a sand-box score based on a comparison of the website score to a threshold and whether the executed URL matches with known rejected URLs in a sand-box training database, wherein the sand-box score is determined to be:

a first value when the website score is below the threshold and the executed URL does not match a known rejected URL stored in the sand-box training database or the website score is above the threshold and the URL matches a known rejected URL stored in the sand-box training database; and a second value when the website score is above the threshold and the URL does not match a known rejected URL stored in the sand-box training database;

sending the sand-box score, by the sand-box controlled module, to an approval unit;

sending the communication protocol information to a connections prediction model;

generating a connections score, by the connections prediction model, using the communication protocol information;

sending the connections score to the approval unit;

sending the computing device metadata to a user-based prediction model;

generating a user-based score, by the user-based prediction model, using the computing device metadata;

sending the user-based score to the approval unit;

determining, by the approval unit, that at least one of the sand-box score, connections score, or user-based score, or combination thereof, is below a pre-determined threshold;

generating, by the approval unit, a rejected flag; and sending the rejected flag to the computing device, wherein the rejected flag causes the computing device to delete the QR code data before causing the restriction flag to be removed so that the access to the computing device is no longer restricted.

12. The method of claim 11, further comprising:

training and developing the website prediction model based on the sand-box training database, wherein the sand-box training database stores a plurality of known accepted and rejected URLs;

training and developing the user-based prediction model based on a user-based training database, wherein the user-based training database comprises a plurality of known computing device metadata; and training and developing the connections prediction model based on a connections database, wherein the connections database stores a plurality of known communication protocol information.

13. The method of claim 11, further comprising:

sending the communication protocol information to a connections training database;

updating and adding the communication protocol information to the connections training database;

training the connections prediction model based on the connections training database, wherein the connections prediction model is re-developed;

sending the computing device metadata to a user-based training database;

updating and adding the computing device metadata to the user-based training database;

training the user-based prediction model based on the user-based training database, wherein the user-based prediction model is re-developed;

sending the URL to a sand-box training database;

updating and adding the URL to the sand-box training database; and training the website prediction model based on the sand-box training database, wherein the website prediction model is re-developed.

14. The method of claim 11, wherein the computing device further comprises a camera, wherein the camera is configured to scan the QR code, wherein the application is configured to process the QR code to augment the QR code data, wherein the QR code data is sent to the deep learning computing platform, and wherein the deep learning computing platform receives the augmented QR code data.

15. The method of claim 11, wherein the restriction flag causes the computing device to restrict access to any code or installation that may run on the computing device.

16. The method of claim 11, wherein the rejected flag causes the computing device to generate a message on a graphical user interface (GUI) of the computing device that indicates the QR code data is rejected and potentially malicious.

17. The method of claim 11, wherein the communication protocol information comprises an IP packet header that comprises at least a source IP address and a destination IP address.

18. The method of claim 11, wherein the communication protocol information comprises (secure sockets layer) SSL or (transport layer security) TLS certificates.

19. One or more non-transitory computer-readable media storing instructions that, when executed by a deep learning computing platform comprising at least one processor, and memory, cause the deep learning computing platform to:

receive, by a sand-box controlled module comprising a sand-box environment and a website prediction model, and based on a scan of a QR code, QR code data from a computing device associated with an application, wherein the QR code data comprises a uniform resource locator (URL) associated with a login page and communication protocol information;

generate and send, by the application, a restriction flag to a system root of the computing device that causes the computing device to restrict access while determining whether the URL is malicious;

generate a website score, by the website prediction model, using the URL;

execute the URL in the sand-box environment and generate a sand-box score based on a comparison of the website score to a threshold and whether the executed URL matches with known rejected URLs in a sand-box training database, wherein the sand-box score is determined to be:

a first value when the website score is below the threshold and the executed URL does not match a known rejected URL stored in the sand-box training database or the website score is above the threshold and the URL matches a known rejected URL stored in the sand-box training database; and a second value when the website score is above the threshold and the URL does not match a known rejected URL stored in the sand-box training database;

send the sand-box score, by the sand-box controlled module, to an approval unit;

send the communication protocol information to a connections prediction model;

generate a connections score, by the connections prediction model, using the communication protocol information;

send the connections score to the approval unit;

determine, by the approval unit, that at least one of the sand-box score, connections score, or combination thereof, is below a pre-determined threshold;

generate, by the approval unit, a rejected flag; and send the rejected flag to the computing device, wherein the rejected flag causes the computing device to delete the QR code data before causing the restriction flag to be removed so that the access to the computing device is no longer restricted.

20. The one or more non-transitory computer-readable media of claim 19, wherein the rejected flag causes the computing device to generate a message on a graphical user interface (GUI) of the computing device that indicates the QR code data is rejected and potentially malicious.

* * * * *